H. BRETSCHER.

DEMOUNTABLE RIM.

APPLICATION FILED AUG. 22, 1919.

Reissued Dec. 16, 1919.

14,770.

2 SHEETS—SHEET 1.

INVENTOR
HANS BRETSCHER.

BY
Dunn Godlitt & Wasserfall
ATTORNEYS

H. BRETSCHER.

DEMOUNTABLE RIM.

APPLICATION FILED AUG. 22, 1919.

Reissued Dec. 16, 1919.

14,770.

2 SHEETS—SHEET 2.

INVENTOR
HANS BRETSCHER

BY

ATTORNEYS

UNITED STATES PATENT OFFICE.

HANS BRETSCHER, OF NEW YORK, N. Y., ASSIGNOR OF ONE-HALF TO FELIX SPITZNER.

DEMOUNTABLE RIM.

14,770. Specification of Reissued Letters Patent. Reissued Dec. 16, 1919.

Original No. 1,290,889, dated January 14, 1919, Serial No. 206,779, filed December 12, 1917. Application for reissue filed August 22, 1919. Serial No. 319,276.

*To all whom it may concern:*

Be it known that I, HANS BRETSCHER, a citizen of Switzerland, and a resident of the borough of Manhattan, city, county, and State of New York, have invented certain new and useful Improvements in Demountable Rims, of which the following is a complete specification.

This invention relates to demountable rims for vehicle wheels of the type used for mounting pneumatic tires.

The inventive idea of a partly, or wholly, collapsible demountable rim for vehicle-wheels has been exploited by other inventors, and a number of forms of demountable rims have been patented, or used, experimentally, or both. However, the difficulty, which the heretofore known constructions of collapsible demountable rims have not successfully solved, is the capability of the interlocking means to resist the tendency of the sections of the rim to spring apart, either radially or transversely, particularly when the rim, with the pneumatic tire secured thereon, is carried in the holder on the vehicle as reserve for replacing one of those affixed on the wheels, the rim being then subjected to the jolts and vibration incidental to the run of the vehicle over rough roads, or when the rim is accidentally dropped, for instance in taking it from the holder to mount it on the wheel. This defect, I believe, has prevented the collapsible demountable rims heretofore devised, from coming into practical use.

The object of my invention is to so construct the means for locking the sections of the rim together that the rim will resist the tendency of the pneumatic tire mounted thereon to collapse it, and also the jolts and vibration to which it is exposed when being carried in the holder on the vehicle, and when the rim with the tire affixed thereto, is being mounted on the felly of the wheel.

A further object of my invention is to effect this without making use of cumbersome duplicate parts, or of auxiliary devices, by which its serviceability is detrimentally affected.

With these objects in view, I have provided a sectional collapsible rim, an embodiment of which I have shown in the accompanying drawings forming a part of this specification.

In the drawings which illustrate the invention,—Figure 1 is a side elevation of my improved demountable rim, showing the locking sections in open position;

Fig. 5 is a bottom view of the joint of the two parts of the segment of the rim shown in Fig. 3 with the connecting plate in position;

Fig. 6 is a sectional view thereof on line 6—6 indicated in Fig. 5;

Fig. 7 is a plan view of the ends of the segment, and of the locking sections of the rim in their position shown in Figs. 1 and 3;

Fig. 8 is a sectional view thereof on line 8—8 indicated in Fig. 7, and

Fig. 9 is a plan view of the ends of the segment and of the locking sections in their closed position, as they are shown in Figs. 2 and 4.

Figure 1:
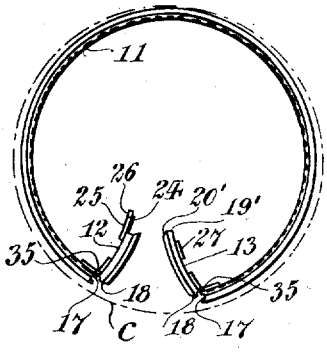

Referring now particularly to Fig. 1, the reference numeral 11 designates the segment, which may be termed the "main section" of the rim. This segment does not conform to a true circle as will be seen by comparing its outline with the dotted line marked *c*, which indicates the periphery of a true circle concentric therewith. The object of this deviation is to utilize the resistance of this segment to being so expanded for assisting in maintaining the sections 12 and 13, securely interlocked. The sections 12 and 13 are hinged, one to each of the ends of the segment 11, and they are interlocked when the pneumatic tire 21 is mounted thereon.

Each of these sections has a cylindrical portion A which is adapted to fit the felly of the wheel on which it is to be mounted. Each end of this cylindrical portion is provided with an outwardly flanged portion B. These flanged portions and the cylindrical portion taken together, provide an annular channel to receive the tire 21.

The hinging of these sections, and the construction of their ends, are shown more particularly in Figs. 1, 3, and 7—9 inclusive.

The sections 12 and 13 are hinged to the section or segment 11 at 35. The ends of segment 11 are recessed at 17, and the corresponding ends of the sections 12 and 13 are provided with projecting tenons 18 fitting into the recesses 17 when the sections are swung outwardly to expand the rim. The lengths of the sections 12 and 13 supplement the segment 11 to form a complete circular rim when these sections are swung into the position shown in Figs. 2, 4 and 9. The free ends of the sections are provided with a configuration which provides a doubly secure joint on account of the overhanging or interlocking of parts. A suitable configuration to accomplish these results will now be described.

The free ends of the cylindrical portion A of one of the hinged sections, section 13 in this instance, is recessed as at 22 so as to receive a tongue 24 projecting from the portion A of section 12. The tongue is shown as having a tapered width, the recess having a corresponding taper. Their maximum widths are nearly equal to the length of cylindrical portion A. As clearly shown in Fig. 7, the ends of the flanged portions B of section 13 project beyond the inner end of the recess 22, thereby providing a bifurcated end or tip for this section.

A plate 25 having a projecting tongue 26 is securely riveted or otherwise fastened to the tongue 24 in such a manner that the end of the tongue 26 projects beyond the end of the tongue 24, the root 28 of the tongue 26 being back of the tip of the tongue 24. A coöperating plate 27 having a configuration opposed to that of plate 25 is riveted or securely fastened to the cylindrical portion A of section 13. This plate is bifurcated, having a recess 29 to receive the tongue 26, its arms 31 encompassing the sides of tongue 26, and abutting the root 28 thereof.

The inner parts of the free ends of the flanged portions B of the hinged sections 12 and 13 are radial, as shown at 19 and 19′ respectively, while the outer parts are chordal as shown at 20 and 20′. The surfaces of these parts are at an obtuse dihedral angle to one another.

As before pointed out, the segment 11 of the rim is resilient, and tends to assume a position which will keep it within the circle *c* of Fig. 1. When, therefore, the hinged sections are brought into the positions shown in Figs. 2, 4 and 9, the segment 11 is flexed, the ends of the segment 11 being moved apart. This tendency of the segment 11 to resume its original form, pressing the sections 12 and 13 toward one another, provides, on account of the configuration of the ends of sections 12 and 13, a very rigid joint between these parts.

Figure 8:
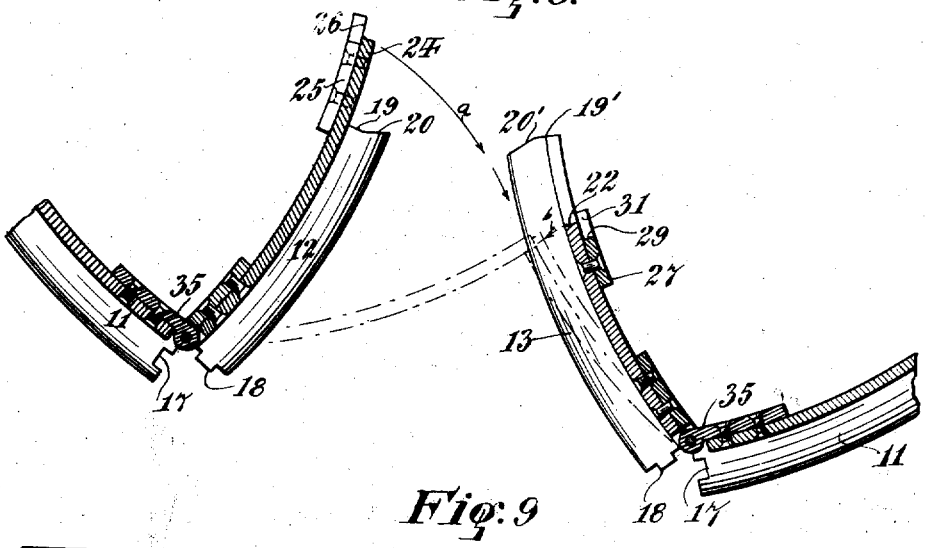
Figure 9:
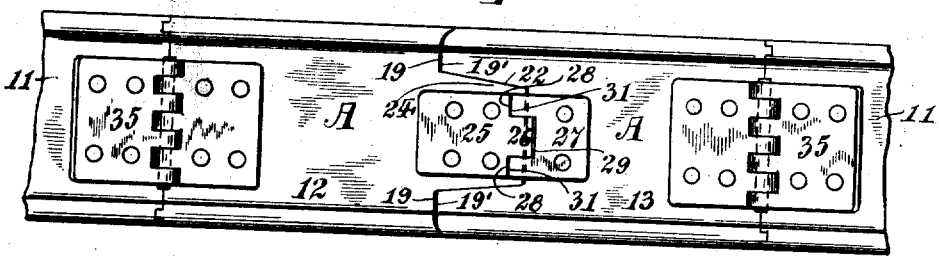

The dotted arcs *a* and *b* of Fig. 8 indicate the paths of movement of the tip of tongue 24 and the bottom part of the recess 22 when sections 12 and 13 are freely swung about the hinges 35. These are the first elements of the sections 12 and 13 to engage when the rim is to be expanded. This early engagement is permitted by reason of the bifurcated end of section 13 which admits the tongue 24 between its projecting flanged portions B.

Figure 2:
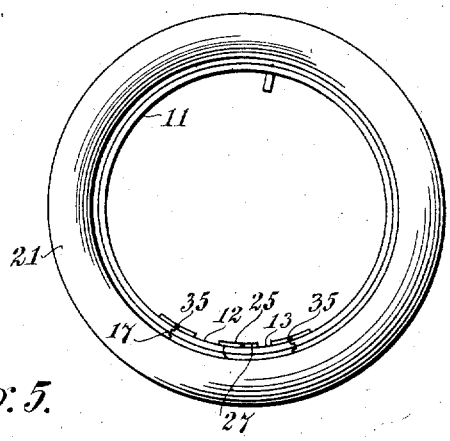
Fig. 2 is a side elevation of the rim, showing a pneumatic tire affixed thereto and the locking sections in closed position.
Figure 4:
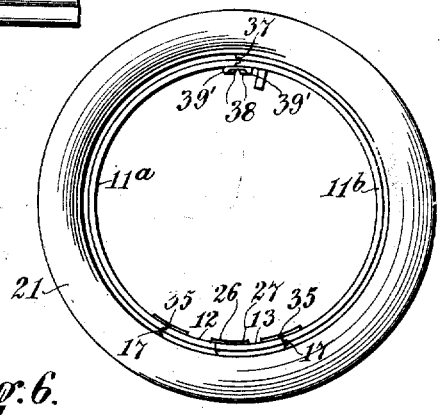
Fig. 4 is an elevation showing the pneumatic tire affixed to this form of my improved demountable rim.

When the sections 12 and 13 are moved to the position shown in Figs. 2 and 4, an overset toggle is provided which will retain the parts in expanded position. In this position, the rim is securely and stably retained on account of the segment 11, due to its resiliency, coöperating with the sections 12 and 13 due to their configuration, before described. The joint is secure in all directions, namely, radially, circumferentially, and laterally.

To apply a pneumatic tire to my improved demountable rim, as shown in Figs. 2 and 4, the rim, with the hinged sections 12 and 13 in about the position shown in Fig. 1, is placed within the tire 21, the nipple of the inner tube being passed through the hole in the rim, and the edges of the casing pressed in within the flanges B of the segment 11. Then the remaining part of the flanges of the casing, opposite the hinged sections 12 and 13, are pressed together and the sections 12 and 13 swung thereon. When these operations are completed, the casing with the rim may be held in an approximately vertical position and the foot of the operator set upon the joint of the free ends of the sections 12 and 13, or sufficient pressure may be otherwise applied to snap the interlocking parts into their locked position. Thereby the segment 11 is spread to conform to the true circular line of the felly of the wheel and the free ends of sections 12 and 13 are interlocked. The tube in the casing may then be inflated to full pressure and the rim and tire are ready to be mounted upon the wheel, or set in the holder, if it is to be carried as a reserve.

To remove the casing from the rim, it must first be deflated. Sufficient force must be applied to the end of sections 12 and 13, not only for spreading apart the resilient segment 11 but also for stretching the casing.

Figure 5:
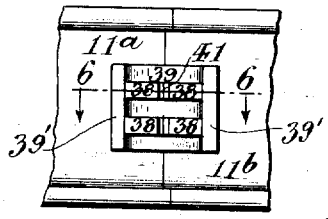
Figs. 5 to 9 are detail views, drawn on an enlarged scale.
Figure 3:
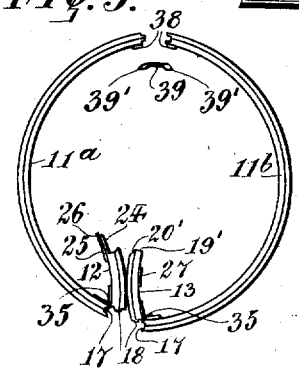
Fig. 3 is an elevation of a demountable rim, constructed according to my invention, in which the segment to which the locking sections are hinged, is made in two parts, and of the connecting plate therefor.
Figure 6:
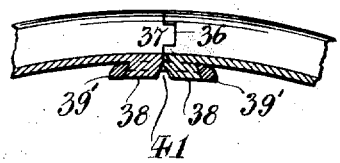
Figure 7:
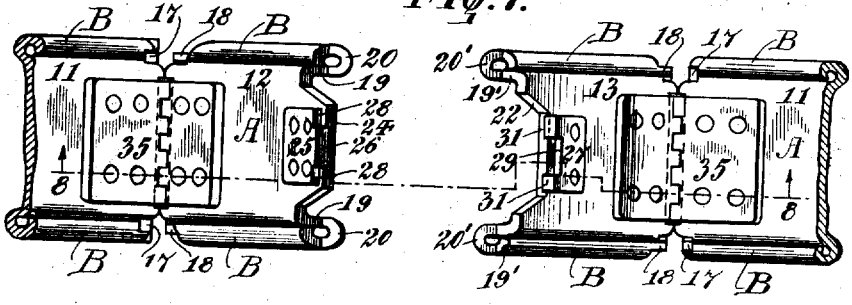

The construction of the rim as thus far described is well suited for wheels of ordinary sizes, but for wheels of larger sizes the segment 11 of the rim is preferably made in two parts, as shown in Fig. 3. The joint between the two parts $11^a$ and $11^b$ of the segment 11 is made as shown in Fig. 6, and as described with reference to the joints of the ends of the segment 11 and the sections 12 and 13. Also in this instance a recess 36 is formed in the flanges of the part $11^b$ and a corresponding tenon 37 at the end of the part $11^a$. To secure these parts firmly together, and to produce the necessary rigid joint, the undercut abutments 38 are formed on each part immediately adjoining their ends. The arrangement and location of these abutments is shown in Fig. 5, where also the locking plate 39 is shown in elevation. These abutments are undercut, as shown in Fig. 6, and form what may be termed "catch-bolts", rigidly engaging with the transverse end bars 39′ of the locking plate. The abutments 38 are also beveled, as shown at 41 in Fig. 6, to enable the parts $11^a$ and $11^b$ to be brought together in an approximately angular position, whereby the outwardly projecting undercut edges of these abutments are brought sufficiently near together to enable the plate 39 to be set thereon, whereupon the interlocking of this plate with the abutments is effected by the moving of the other ends of the parts $11^a$ and $11^b$ apart. The parts $11^a$ and $11^b$ of the segment 11 are thus joined when the tire 21 is applied thereon. The described means for thus connecting and locking together the parts $11^a$ and $11^b$ produce a rigid joint, the plate 39 engaging with the abutments 38 and holding the parts together longitudinally and laterally. The interlocking of the tenons 37 in the recesses 36, assists in producing a secure joint of the two parts, resisting their separation or displacement in a direction to, or away, from the center, and also laterally.

For mounting a tire casing upon the two part rim, illustrated in Figs. 3 and 4, the two parts $11^a$ and $11^b$ are inserted in the casing, laid out on the work bench, with their free ends together and so that the nipple of the inner tube may be inserted through the hole provided for it in the rim; the edges of the casing are then pressed together and within the flanges of each of the parts $11^a$ and $11^b$. Then the plate 39 is set upon the abutments 38 and the ends of the parts $11^a$ and $11^b$, to which the sections 12 and 13 are hinged, moved apart to conform to the inner periphery of the tire casing 21. The further procedure is the same as hereinbefore set forth with reference to the form of the rim, illustrated in Figs. 1 and 2 of the drawings.

Extended practical experience with demountable rims, constructed according to this, my invention, has demonstrated that the ends of the hinged sections 12 and 13 are not disengaged when the rim, with the tire mounted thereon, is exposed to the vibrations, incidental to being carried on the vehicle traveling over rough roads, nor by the harder jolts it receives in the necessary handling of it when being applied to the felly of the wheel.

I claim:

1. A demountable rim for a vehicle wheel, comprising sections, hinged to swing inwardly, and each having a tenon on the hinged end, snugly fitting into a correspondingly shaped recess in the end of the adjoining section; the hinged sections having their free ends cut at an obtuse angle by two planes perpendicular to the plane of the rim and fitted to interlock when swung into their position in the peripheral line of the rim; substantially as herein shown and described.

2. A demountable rim for a vehicle wheel, comprising sections, hinged to swing inwardly, and each having a tenon on the hinged end, snugly fitting into a correspondingly shaped recess in the end of the adjoining section; the hinged sections having their free ends cut at an obtuse angle by two planes perpendicular to the plane of the rim, and one of the hinged sections having a tongue and the other a correspondingly shaped and dimensioned recess, formed on its free end; the free ends of these sections being thus fitted to interlock when swung into their position in the peripheral line of the rim; substantially as herein shown and described.

3. A demountable rim for a vehicle wheel comprising sections, hinged to swing inwardly, and having a tenon on one end snugly fitting into a correspondingly shaped recess in the end of the adjoining section; the hinged sections having their free ends cut at an obtuse angle by two planes perpendicular to the plane of the rim; one of the hinged sections having a tongue formed on its free end and the other a correspondingly shaped and dimensioned recess, adapted to receive the tongue formed on the free end of the other hinged section; a plate, having a tongue formed thereon, affixed upon the tongue of one of the hinged sections; a second plate, having a recess formed therein fitted to receive the tongue formed on the first plate, affixed at the edge of the recessed portion of the free end of the other hinged section, the said plates, and the free ends of the hinged sections being thus fitted to interlock when swung into their position in the peripheral line of the rim; substantially as herein shown and described.

4. The combination with a demountable rim for vehicle wheels, composed of separable sections, of undercut abutments, affixed on the adjoining edges of the sections, and of a plate fitted to the rim and adapted to embrace the abutments and to engage with the undercut portions thereof when the ends of the sections are joined, thereby holding the ends of the sections together; substantially as herein shown and described.

5. Means for securing together the adjoining ends of sections of a demountable rim, the means comprising undercut abutments, one at the end of each section, and a plate, fitted to embrace the abutments, and to engage with the undercut edges thereof, when the sections are joined together; substantially as herein shown and described.

6. Means for securing together the adjoining ends of sections of a demountable rim, the means comprising a tenon on the end of one section and a correspondingly shaped recess on the end of the other section; undercut abutments, one at the end of each section, and a plate, fitted to embrace the abutments, and to engage with the undercut edges thereof, when the sections are joined together; substantially as herein shown and described.

7. A demountable rim for a vehicle wheel, comprising sections, hinged to swing inwardly, the hinged sections having their free ends cut at an obtuse angle by two planes perpendicular to the plane of the rim and fitted to interlock when swung into their position in the peripheral line of the rim; substantially as herein shown and described.

8. A demountable rim for a vehicle wheel, comprising sections, hinged to swing inwardly, the hinged sections having their free ends cut at an obtuse angle by two planes perpendicular to the plane of the rim, one of the hinged sections having a tongue and the other a correspondingly shaped and dimensioned recess, formed on its free end; the free ends of these sections being thus fitted to interlock when swung into their position in the peripheral line of the rim; substantially as herein shown and described.

9. A demountable rim for a vehicle wheel, comprising sections, hinged to swing inwardly, the hinged sections having their free ends cut at an obtuse angle by two planes perpendicular to the plane of the rim; one of the hinged sections having a tongue formed on its free end and the other a correspondingly shaped and dimensioned recess, adapted to receive the tongue formed on the free end of the other hinged section; a plate, having a tongue formed thereon, affixed upon the tongue of one of the hinged sections, a second plate, having a recess formed therein fitted to receive the tongue formed on the first plate, affixed at the edge of the recessed portion of the free end of the other hinged section, the said plates, and the free ends of the hinged sections being thus fitted to interlock when swung into their position in the peripheral line of the rim; substantially as herein shown and described.

10. A demountable rim for vehicle wheels whose intermediate portion is cylindrical and whose edges are outwardly flanged, said rim comprising sections hinged to swing inwardly, the cylindrical portion of one of the sections, having a tongue projecting beyond the flanged portions of said section, the cylindrical portion of the other section thereof having a recess whereby, with the flanged portions of that section a bifurcated end is provided, said recess being adapted to receive said tongue.

11. A demountable rim for vehicle wheels whose intermediate portion is cylindrical and whose edges are outwardly flanged, said rim comprising sections hinged to swing inwardly, the cylindrical portion of one of the sections having a tongue projecting beyond the flanged portions of said section, the cylindrical portion of the other section thereof having a recess whereby, with the flanged portions of that section, a bifurcated end is provided, said recess being adapted to receive said tongue, the ends of the inner part of the outwardly flanged portions being substantially radial, the outer parts of said flanged portions being chordal.

12. A demountable rim for vehicle wheels whose intermediate portion is cylindrical and whose edges are outwardly flanged, said rim comprising sections hinged to swing inwardly, the cylindrical portion of one of the sections having a tongue projecting beyond the flanged portions of said sections, said tongue carrying a plate projecting slightly beyond the end thereof, the cylindrical portion of the other section thereof having a recess whereby, with the flanged portions of that section, a bifurcated end is provided, said recess being adapted to receive said tongue, said second cylindrical portion carrying a recessed plate adjacent its recess to coöperate with the first mentioned plate.

13. A demountable rim for vehicle wheels whose intermediate portion is cylindrical and whose edges are outwardly flanged, said rim comprising sections hinged to swing inwardly, the cylindrical portion of one of the sections having a tongue projecting beyond the flanged portions of said sections, said tongue carrying a plate projecting slightly beyond the end thereof, the cylindrical portion of the other section thereof having a recess whereby, with the flanged portions of that section, a bifurcated end is provided, said recess being adapted to receive said tongue, said second cylindrical portion carrying a recessed plate adjacent its recess to coöperate with the first mentioned plate, the ends of the inner part of the outwardly flanged portions being substantially radial, the outer parts of said flanged portions being chordal.

14. A demountable rim for vehicle wheels whose intermediate portion is cylindrical and whose edges are outwardly flanged, said rim comprising sections hinged to swing inwardly, the ends of the inner part of the outwardly flanged portions being substantially radial, the outer parts of said flanged portions being chordal.

HANS BRETSCHER.